United States Patent Office 3,499,752
Patented Mar. 10, 1970

3,499,752
PROCESS AND APPARATUS FOR PULSATING A LIQUID IN A PULSATION COLUMN
Winfried J. W. Vermijs, Geleen, Netherlands, assignor to Stamicarbon N.V., Heerlen, Netherlands
Filed July 22, 1964, Ser. No. 384,395
Claims priority, application Netherlands, July 26, 1963, 295,891
Int. Cl. F01b *31/12;* F01l *21/04*
U.S. Cl. 91—335                    12 Claims

ABSTRACT OF THE DISCLOSURE

The pulse generator is based upon the resonance of a liquid column in conjunction with a volume of gas which acts as a spring. Oscillations are set up and maintained in the column by the alternate injection and exhaust of gas to and from the gas space. The system of gas valves is triggered by the movement of a diaphragm that separates the gas cushion from the liquid, so that the operating frequency is always the resonant frequency of the gas-liquid combination.

---

The present invention relates to a process and apparatus for pulsating a liquid in a pulsation column. In the process industry such columns are often used for treating liquids by providing means for pulsating the liquids in the column, so that, in addition to their normal flow through the column from one end to the other the liquids are imparted with a lower amplitude up-and-down movement. It has been proposed in the prior art, for instance in Belgian patent specification No. 544,104, to effect such pulsation in a column by means of a diaphragm, a bellows, or a piston fitted for instance in the lower part of the column wall, or in the bottom of the column, and usually driven by an eccentric cam-like arrangement.

It is a primary object of the present invention to provide an improved method and apparatus for providing pulsation in a pulsation column and utilizing mechanical resonance produced by resting the liquid mass on an air cushion, and periodically blowing air into the said air cushion and allowing it to escape again. The supply and discharge of air to and from the air cushion being preferably controlled by the movement of the liquid itself.

Another object of the invention is the provision of apparatus for pulsating a liquid in a column by means of a diaphragm clamped in the wall of the column, the apparatus according to the invention being characterized in that behind the diaphragm there is a closed air-filled space to and from which compresed air is supplied and discharged and wherein the supply and discharge is controlled by the periodic movements of the diaphragm.

Yet another object of the invention is the provision in an improved method and apparatus of the type described of means whereby the amplitude of the pulsation can be controlled simply by varying the amount of air supplied and discharged per unit time and wherein the pulsation frequency can be controlled by varying the volume of the air cushion.

These and other objects of the invention and the principles and entire scope of the present invention will become more clearly apparent in the following detailed discussion relating to illustrative embodiments thereof shown in the attached drawings.

Figure 2:
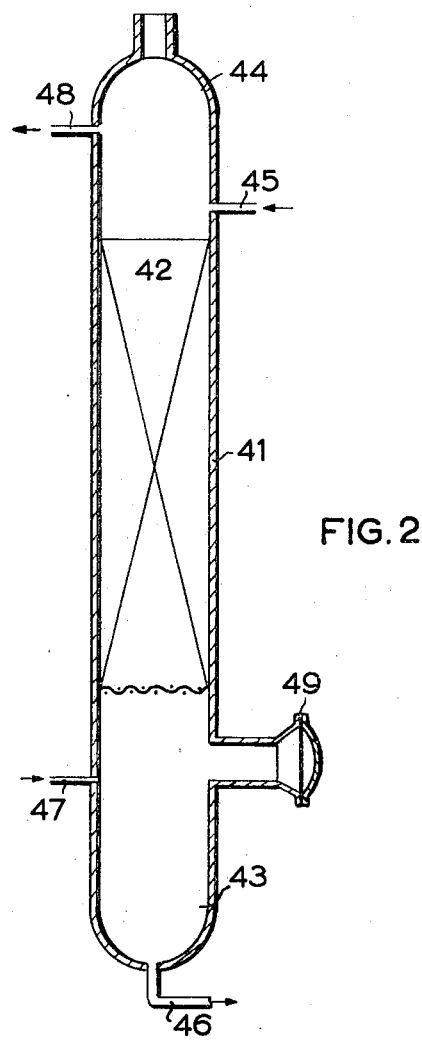
FIGURE 2 is a somewhat schematic vertical longitudinal sectional view of a column adapted for utilizing apparatus according to the invention.

In FIGURE 2, reference numeral 41 indicates an extraction column, which, over the greater part of its length, may be packed with regularly distributed conventional contact area increasing filling material (filling bodies) generally indicated at 42 resting on a foraminous plate in such a way that collecting chambers 43 and 44 are left at the bottom and top of the column below and above the filling material. Instead of filling material, sieve plates or other customary means may be used depending on the treatment to be carried out. In operating the column 41 as a counter current extracter the heavy liquid or feed is introduced via conduit 45 emerging into collecting chamber 44, passes downwardly through the column as a raffinate stream, is collected in chamber 43, is discharged via conduit 46 as a raffinate product and the lighter liquid or solvent is introduced via conduit 47 which emerges under or into the packed portion of the column, flows upwardly therethrough after having been collected in chamber 44 and is discharged via conduit 48 as extract product.

Figures 1, 1A:
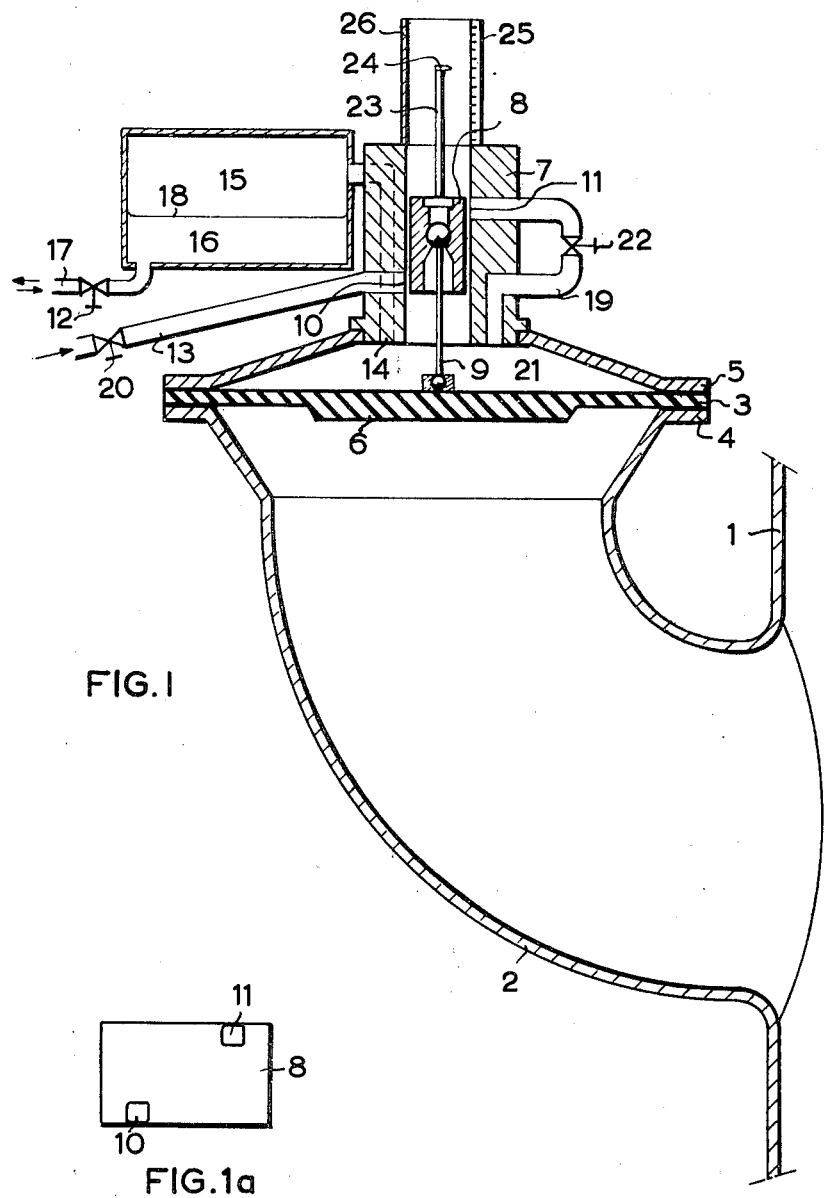
FIGURE 1 is a vertical longitudinal sectional view of an apparatus according to the invention for pulsating a liquid in a column.
FIGURE 1a is a schematic development of the slide valve piston portion showing the relation of the generally square housing ports thereto.

A pulsation device 49 as shown in FIGURE 1 is connected to the column 41 near the lower end of the side wall thereof as illustrated diagramatically in FIGURE 2.

Referring now to FIGURE 1, the numeral 1 indicates part of the vertical side wall of a pulsation column filled with liquid such as the one shown in FIGURE 2. The pulsation device is connected to the wall of the said column by means of an elbow-like conduit section 2. The device comprises a somewhat resilient diaphragm 3 which is clamped along its circumference between two annular flanges 4 and 5. The central region of diaphragm 3 is preferably reinforced to ensure that the diaphragm will flex without giving rise to high amplitude oscillating motion. Reinforcement over 50 percent of the diameter of the active area of the diaphragm has proved sufficient in most cases. Diaphragm 3 is made of rubber or any other suitable material and reinforced by increasing the thickness of the central region thereof or incorporating a stiffener in the central region. A cylindrical housing 7 having a longitudinal throughbore is connected to the concave flange 5 at the radially inner periphery thereof. Housing 7 throughbore slidably receives a slide valve 8 to which a rod 9 is connected preferably by means of a ball and socket joint. The other end of the said rod 9 is connected also preferably by means of a ball and socket joint, to the central region of the diaphragm 3. Rod 9 and slide valve 8 thus follow the movements of the diaphragm central region.

A feed port 10 intersects the throughbore of housing 7, towards the end thereof nearest the diaphragm 3, and connects with a compressed air conduit 13. The amount of compressed air supplied per unit time through the conduit 13 can be controlled by means of an adjustable valve 20 interposed therein.

Near the other end of housing throughbore is a vent port 11, which, via a conduit 19, communicates with the space 21 defined between the diaphragm 3 and the flange 5. A longitudinally directed bore 14 in housing 7 communicates the space 21 with a control chamber 15. The chamber 15 is adapted to be partly filled with liquid, preferably mineral oil 16 or the like. The level 18 of the oil in chamber 15, and hence, the air volume in chamber 15, can be changed within given limits by discharging or supplying oil via conduit 17 and valve 12. Variation of the flow rate through the vent port is provided by an adjustable valve 22 interposed in the conduit 19.

According to the preferred embodiment shown especially in FIGURES 1 and 1a the axial overall distance between the openings 10 and 11 exactly equals to the axial length of the slide valve 8, so that in the position shown in FIGURE 1 the slide valve 8 closes the two openings 10 and 11 simultaneously. By preference, the ports 10 and 11 are more or less rectangular in section thus ensuring that a considerable portion of the inlet port 10 or outlet port 11 will be exposed immediately when slide valve 8 is moved out of equilbrium under the action of diaphragm 3. FIGURE 1a especially shows the location of the ports 10 and 11 in relation to the developed outer circumferential surface of slide valve 8.

The pulsation device of the invention operates as follows. When column 1 has been filled with liquid above the level of the diaphragm 3 with compressed-air valve 20 closed, the central region of the diaphragm 3 will have been raised due to the hydrostatic pressure thereupon. This change in position of the diaphragm central region transfers to the slide valve 8 via rod 9, as a result of which opening 10 is no longer shut off by the slide valve 8. The valve 20 is then opened and accordingly compressed air flows into the spaces 21 and 15 via conduit 13 and the opening 10. Inasmuch as the pressure exerted by the compressed air is higher than the hydrostatic pressure exerted on the diaphragm by the liquid present in the column, diaphragm 3 is pushed downwards, i.e. towards the column, thereby driving the liquid present in the bend 2 ahead of it. This diaphragm deflection causes the slide valve 8 to shut off feed opening 10 but owing to the inertia of the liquid mass in the column, the diaphragm continues its downwards movement thus opening port 11. The spaces 15 and 21 are thereby put in communication with the atmosphere via conduits 14, 19, valve 22 and port 11, and the pressure in these spaces decreases to atmospheric. At this point the hydrostatic pressure exerted on the diaphragm by the liquid in the column begins to push the diaphragm upwardly and after having passed the position in which the openings 10 and 11 are shut off by slide valve 8, the diaphragm is raised further by the inertia of the liquid mass in the column. As a result, port 10 is exposed again and the compressed air will re-enter the spaces 15 and 21. A vibrating movement is thus maintained as the cycle just discussed repeats continuously. To ensure operation of the device, in the manner discussed, the central portion 6 of the diaphragm 3 has been made more rigid than the peripheral region thereof because otherwise the movement of slide valve 8 would not be sufficiently synchronous with the movement of the liquid in the column at operating cycling rates and there would be the hazard that the pulsator movements will get out of control.

The amplitude of the pulsation is determined by the amount of air supplied and discharged from the chamber behind the diaphragm per unit time. It can be continuously varied during operation by adjustment of the valves 20 and 22 as outlined hereinbefore.

In order that the movements of the slide valve 8 in the housing 7 can be observed and the length of its stroke can be easily determined, a vertical rod 23 is fastened on top of the slide valve, the said rod being provided, at its upper end, with a pointer 24 which reciprocates in the scale 25 equipped transparent tube 26 fastened on top of the housing 7.

The frequency of the pulsation provided by the device depends on many parameters. The controlled variation of one of these, the volume of the air cushion, permits easy adjustment of the frequency. This is accomplished in the apparatus shown by changing the oil level 18 in the chamber 15 utilizing the valve 12.

The resonance frequency of the system can be calculated as follows, wherein the mechanical oscillation system is in principle found to follow the familiar relation known from electronics, for calculating the resonance frequency of an electrical oscillation circuit:

$$\omega^2 = \frac{1}{L \cdot C} \quad (1)$$

In the present case, however, other meanings are attributed to the symbols as noted below. Summation over the length $l$ of the body of liquid between the diaphragm and the top of the liquid in the column, for instance, yields:

$$L = \Sigma \frac{\rho \cdot l}{F} \quad (2)$$

wherein expressed in MKS-units,
$\rho$=density of the liquid kg./m.$^3$,
$l$=length of the body of liquid in meters (see above),
$F_2$=cross-sectional area of the said body of liquid in m.$^2$ (measure normal to the length dimension $l$).

Measurements have shown that the term $$\frac{\rho \cdot l}{F}$$

is larger for a column section packed with filling bodies than for the same part were it filled with liquid only. If Raschig rings are used as packing, this multiplier has been found to be about 3. This is attributed to the tortuous path which the liquid follows through random Rashig ring packing effecting greater accelerations than would be the case in a column part of the same size which does not contain such rings.

The following relationship is also applicable to the air cushion system as disclosed herein:

$$C = \frac{C_v}{C_p} \cdot \frac{V_o}{P_o} \quad (3)$$

In this equation $C_v/C_p = 0.7$ (for air)
$V_o$=volume of the air cushion in the position of equilibrium, m.$^3$,
$P_o$=absolute pressure in the air cushion, Nm.$^2$.

If the column operates under atmospheric pressure (which is appr. $10^5$ Nm.$^2$, then:

$$P_o = 10^5 + \rho \cdot g \cdot h \text{ Nm.}^2,$$

$h$ being the vertical height of the liquid level in m. over the diaphragm in the column. (If the diaphragm is horizontal at the bottom of the column, then $h=1$ as hereinbefore defined.)

At the rate of pulsation that the packing material starts moving along with the liquid pulsating in the column the frictional force equals the weight of the submerged Raschig rings. Using the method of calculation indicated by Brown and co-workers in the book "Unit Operations" (John Wiley & Sons Inc., New York, 1951), pages 210-217, the following equation is found to be applicable for the pressure drop across the turbulent area in a tube or column filled with Raschig rings:

$$\Delta p = \left[ 20 \frac{\eta^{0.2} \cdot \rho^{0.8} \cdot H}{D_P 1.2} \cdot [1 + 35(1-\tau)^3] \right] v^{1.8} \quad (4)$$

or, denoting the quantity within the larger brackets as R:

$$\Delta p = R \cdot v^{1.8} \quad (4a)$$

In these equations
$\eta$=dynamic viscosity, nsec./m.$^2$
$\rho$=density of the liquid, kg./m.$^3$
$v$=flow rate in empty column, m./sec.
$H$=height of the column packing, m.
$D_P$=nominal exterior diameter of the Raschig rings, m.
$\tau = D_{internal}/D_P$ Owing to settling of the Rashig rings, the factor R may in practice be up to twice as large as can be calculated from the abovementioned formulae more exact values therefore being determinable from empirical data.

The following equation can now be derived for the maximum allowable upward rate of flow:

$$F \cdot R \cdot v^{1.8} \leq (1-\epsilon)(\rho_v - \rho) \cdot g \cdot h \cdot F$$

from which it follows that:

$$v^{1.8} \leq \frac{(1-\epsilon)(\rho_v - \rho) \cdot g \cdot h}{R} \quad (5)$$

In these equations $\epsilon$ = porosity $\approx 0.35 + \cdot \tau^2$
$\rho_v$ = density of the filling material, kg./m.$^3$ If the pulsation proceeds sinusoidally with time, $$v_{max} = A \cdot \omega$$

where A indicates the amplitude in the empty column, in m., and $\omega$ equals $2\pi f$. $f$ = frequency, sec.$^{-1}$.

Equation 5 then changes into:

$$(A\omega)^{1.8} \leq \frac{(1-\epsilon) \cdot (\rho_v - \rho) \cdot g \cdot h}{R} \quad (6)$$

The maximum downward rate of flow which, according to theory, can be achieved by the use of this pulsation principle equals the drainage rate from an empty column. The said rate is mostly higher than the allowable upward rate of flow, because:

$$\rho > (1-\epsilon)(\rho_v - \rho) \quad (7)$$

Only when heavy metal rings are used (large $\rho_v$), is this not the case.

When the passage area of the outlet openings is large compared with that of the inlet openings, accomplished by fully opening the valve 22 and almost closing the valve 20, non-symmetrical pulsations are produced in the column utilizing the device according to the invention. Saw-tooth pulsations will then be produced with the slower stroke thereof being directed upwards, so that considerably greater frictional forces can be generated without the filling material in the column being lifted than in the case of normal sinusoidal pulsations. As a result, the contact between the liquid in the columns will be more intimate so that columns of smaller length can be used.

In the foregoing formulae, in each instance like symbols denote like factors and of the factors not previously or hereinafter defined:

$C_p$ = specific heat at constant pressure
$C_v$ = specific heat at constant volume and
$g$ = acceleration of gravity

EXAMPLE

Extraction column for extracting nitrolactam from nitrobenzene with the aid of ammonia.

Column: $F$ = 0.038 m.$^2$; liquid level over diaphragm 3.4 m.; length of lateral connecting piece 0.35 m.; $F^1$ (cross-sectional area of the lateral connecting piece) = 0.02 m.$^2$.
Liquids: $\rho$ = 1150 kg./m.$^3$; $\eta$ = $5 \cdot 10^{-4}$ nsec./m.$^2$.
Packing: $D_p$ = 0.01 m.; $\tau$ = 0.84; $\epsilon$ = 0.81; $H$ = 2.6 m.
Amplitude: $2.5 \cdot 10^{-3}$ m. Volume displaced per stroke = 190 ml.
Frequency: 220/min., $\omega$ = 23. $A \cdot \omega$ = $5.8 \cdot 10^{-2}$ m./sec.

Calculated buffer volume $V_0$ of the pulsator = 1.3 litres.
This capacity can be adjusted between 1.0 and 4.0 litres by means of the oil level 18 in the auxiliary chamber 15. In practice, the abovementioned frequency was reached at a capacity of 1.6 litres, presumably owing to the diaphragm being somewhat rigid. Allowable rate of flow: With $\rho_v$ = 2800 kg./m.$^3$, as in the case of glass Raschig rings, Equation 6 yields $(A \cdot \omega)^{1.8} \leq 1.11 \cdot 10^{-2}$ or $$A\omega \leq 8.3 \cdot 10^{-2} \text{ m./sec.}$$

The compressed-air consumption of the pulsator was normally 4Nm.$^3$/hour, which, at the compressed air pressure used, corresponds to a power of appr. 100 watts.

Figure 3A:
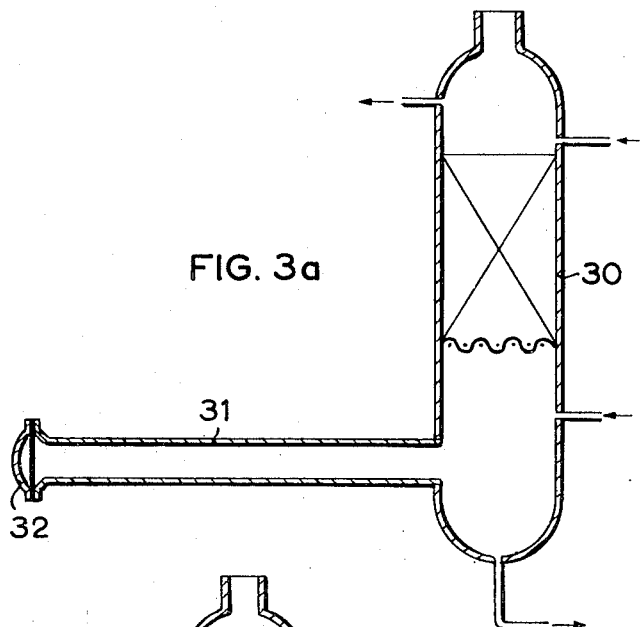
FIGURES 3a and 3b are vertical longitudinal sections of columns for accomplishing chemical processing wherein gas bubbles are generated, the columns being adapted to utilize the pulsation device according to the invention.

If a gas (e.g. $CO_2$) is formed in any reaction taking place between the liquids present in the column, it has been found that the process and the device according to the invention can be applied by modification thereof to overcome the effect of the greater compressibility of the column contents produced by the gas which would greatly damp the oscillation being produced. According to the invention, this drawback is obviated by placing a tube which is filled with liquid only and the factor $$\frac{\rho \cdot 1}{F}$$

of which is a multiple of that of the column, between the column in which the said gas-producing reaction takes place and the pulsation device, so that the frequency of the mechanical oscillation system is determined mainly by the liquid volume in the tube and the influence of the gas bubbles in the column becomes negligible. A diagrammatical representation of a preferred embodiment of this arrangement is shown in FIGURE 3a. Column 30 may contain gas bubbles and generally horizontal tube 31 which is filled only with liquid is connected to column 30 at its inner end. A schematically represented pulsation device 32 identical to that described relative to FIGURE 1 is provided at its other end.

Figure 3B:
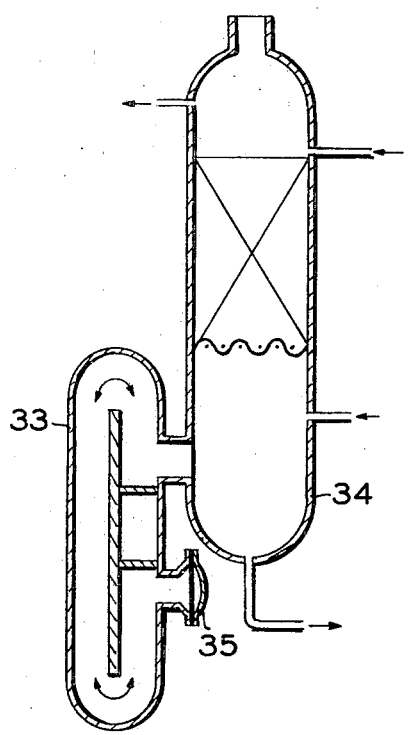

The tube need not be straight, but may, in order to save space, be either bent or folded. An example of a preferred arrangement of the latter is shown in FIGURE 3b. The tube 33 shown in this figure is folded so as to resemble a C and is arranged beside the lower part of the column 34. The diagrammatically represented pulsation device 35 identical in detail to that shown in FIGURE 1, is provided under the connecting piece joining the tube 33 to the column.

The required amplitude of the pulsation in the column can be obtained by choosing suitable sectional ratios between the tube and column as noted above.

It should now be apparent that the apparatus and method as disclosed herein effectively accomplish each of the objects set forth at the outset of this specification, and adequately communicate the principles of the invention. Inasmuch as the specific embodiments described herein are susceptible of considerable variation and modification without departing from the invention's principles, the invention should be understood as encompassing all such modifications which lie within the spirit and scope of the following claims.

I claim:

1. A process for pulsating liquid in a column, in which the liquid in the column is at least partly supported by a gas cushion comprising:
  (a) intermittently temporarily increasing the pressure in the gas cushion to impart successive upward impulses to the liquid in the column; and
  (b) timing such pressure increases to follow cushioning fall of the liquid to maintain the system which comprises the liquid in resonance.

2. A process as set forth in claim 1 wherein the pressure in the cushion is intermittently temporarily increased by intermittently forcing additional gas into the space confining the cushion and then allowing gas to escape from such space.

3. A process as set forth in claim 2 wherein the entry and discharge of gas to and from said space is controlled by the movement of the liquid itself.

4. A process as set forth in claim 1 comprising the additional step of controlling the amplitude of pulsation of the fluid in the column by varying the amount of pressurized fluid supplied to and discharged from the cushion per unit time.

5. A process as set forth in claim 1 comprising the additional step of controlling the frequency of pulsation of the fluid in the column by varying the capacity of the inflatable cushion.

6. A process as set forth in claim 1 comprising the additional step of providing asymmetry in the pulsation of the fluid in the column by supplying said pressurized fluid to said cushion at a different rate than pressurized fluid is discharged from the cushion.

7. A process as set forth in claim 1, applied for pulsating liquid material containing gas bubbles, wherein the said gas cushion is caused to pulse a body of liquid which is devoid of gas bubbles and which occupies an extension of the column and is subjected to the pressure head of the liquid therein.

8. Apparatus for pulsating a liquid in a column, comprising: a flexible diaphragm which forms part of the wall of the column, said diaphragm having one surface thereof disposed for communicating with liquid within the column, and also forming part of the boundary of a space for containing a quantity of gas under pressure to form a cushion for supporting liquid in the column when this is filled with liquid and gas admission and discharge ports via which gas can be forced into and discharged from said space, said diaphragm being operatively associated with valve means for controlling said gas admission and discharge ports, so that the gas pressure in said space can be intermittently temporarily increased to impart successive upward impulses to such column of liquid in such timed relation to the fall of the liquid column that the system is in resonance.

9. Apparatus for pulsating a liquid within a column wherein gas bubbles are generated, comprising tube means extending generally laterally from said column in the lower region thereof and arranged for communication with liquid in said tube and also forms part of the boundary of a space for containing a quantity of gas under pressure to form a cushion for supporting liquid in the column when this is filled with liquid, and gas admission and discharge ports via which gas can be forced into and discharged from said space, said diaphragm being operatively associated with valve means for controlling said gas admission and discharge ports, so that the gas pressure in said space can be intermittently temporarily increased to impart successive upward impulses to such column of liquid in such timed relation to the fall of the liquid column that the system is in resonance.

10. Apparatus as set forth in claim 9 for pulsating a liquid within a column wherein gas bubbles are generated comprising tube means extending generally laterally from said column in the lower region thereof and being arranged for communication with liquid within the column; flexible diaphragm means interposed in said tube adjacent the end thereof away from the column and having one surface thereof arranged for communication with liquid in said tube; means defining a fluid tight chamber disposed adjacent the opposite surface of said diaphragm from said one surface, means for alternately supplying and withdrawing pressurized gas from said chamber to intermittently distend said diaphragm toward said column.

11. Apparatus as set forth in claim 8 including means for controlling the amplitude of pulsation in the column by varying the amounts of gas which respectively enter and discharge from the gas cushion space per unit time, said controlling means being operable for individually varying the rate of gas supply and discharge to thereby effect asymmetric pulsations.

12. Apparatus as set forth in claim 8 additionally including means for varying the capacity of said gas cushion to thereby control the frequency of pulsation in the liquid, said capacity varying means comprising a container for liquid communicating with said cushion space and means for supplying and withdrawing liquid from said container.

References Cited

UNITED STATES PATENTS

| 800,769 | 2/1904 | Steinbart | 230—21 |
| 906,177 | 12/1908 | Westinghouse. | |
| 1,067,613 | 7/1913 | Lane | 91—273 |
| 2,925,806 | 2/1960 | Taylor | 91—335 |
| 3,285,138 | 11/1966 | Otten | 91—341 |
| 2,311,414 | 2/1943 | Peterson | 91—331 |
| 3,078,683 | 2/1963 | Dros | 62—6 |
| 3,115,014 | 12/1963 | Hogan | 62—6 |
| 3,115,016 | 12/1963 | Hogan | 62—6 |
| 3,327,486 | 6/1967 | Kohler et al. | 62—6 |

FOREIGN PATENTS 730,390   3/1966   Canada.

PAUL E. MASLOUSKY, Primary Examiner

U.S. Cl. X.R.

23—267; 91—1, 245, 341

UNITED STATES PATENT OFFICE
CERTIFICATE OF CORRECTION

Patent No. 3,499,752　　　　　　　　　　　　　　　　March 10, 1970

Winfried J. W. Vermijs

It is certified that error appears in the above identified patent and that said Letters Patent are hereby corrected as shown below:

Column 4, line 72, "Rashig" should read -- Raschig --.
Column 8, under References cited, lines 32 up to and including 39 should be cancelled.

Signed and sealed this 15th day of September 1970.

(SEAL)
Attest:

Edward M. Fletcher, Jr.　　　　　　　　　　WILLIAM E. SCHUYLER, JR.
Attesting Officer　　　　　　　　　　　　　　　Commissioner of Patents